United States Patent [19]

Nishikawa

[11] Patent Number: 4,472,982

[45] Date of Patent: Sep. 25, 1984

[54] TILTABLE STEERING APPARATUS FOR VEHICLES

[75] Inventor: Masumi Nishikawa, Toyoake, Japan

[73] Assignee: Aisin Seiki Kabushiki Kaisha, Kariya, Japan

[21] Appl. No.: 354,458

[22] Filed: Mar. 3, 1982

[30] Foreign Application Priority Data

Mar. 4, 1981 [JP] Japan ............................. 56-30565[U]

[51] Int. Cl.³ ..................... B62D 1/16; G05G 5/06; F16D 1/00; F16C 11/00
[52] U.S. Cl. ....................................... 74/493; 74/536; 403/24; 403/97
[58] Field of Search ................ 74/493, 533, 536, 110; 280/775; 403/24, 93, 97; 292/37

[56] References Cited

U.S. PATENT DOCUMENTS

| | | | |
|---|---|---|---|
| 975,320 | 11/1910 | Bilsland | 403/97 |
| 1,655,133 | 1/1928 | Clase | 74/110 |
| 2,185,779 | 1/1940 | Tveidt | 74/493 |
| 3,168,156 | 2/1965 | Ulinski | 74/493 |
| 3,302,478 | 2/1967 | Pauwels | 74/493 |
| 3,355,962 | 12/1967 | Gerdes et al. | 74/493 |
| 3,545,786 | 12/1970 | Yoder | 403/97 |
| 4,041,796 | 8/1977 | Shishido | 74/493 |
| 4,078,448 | 3/1978 | Naka | 74/493 |

FOREIGN PATENT DOCUMENTS

| | | | |
|---|---|---|---|
| 2101018 | 1/1971 | Fed. Rep. of Germany | 74/345 |
| 48201 | 1/1982 | Japan | 74/493 |
| 1018485 | 7/1961 | United Kingdom | 74/493 |

Primary Examiner—Lawrence J. Staab
Assistant Examiner—Michael J. Gonet
Attorney, Agent, or Firm—Oblon, Fisher, Spivak, McClelland & Maier

[57] ABSTRACT

A tiltable steering apparatus for vehicles is provided wherein a movable bracket is rotatably supported in a holder member of a fixed bracket, a latch member having a toothed portion engageable with teeth of the holder member is provided on the movable bracket and means are provided for positively engaging and disengaging the toothed portion of the latch member and the teeth of the holder member.

4 Claims, 4 Drawing Figures

TILTABLE STEERING APPARATUS FOR VEHICLES

BACKGROUND OF THE INVENTION

1. Field of the Invention

The present invention relates to a tiltable steering apparatus, and more particularly to a tiltable steering apparatus for vehicles.

2. Description of the Prior Art

In a conventional tiltable steering apparatus for vehicles, a movable member is locked to a fixed member through a frictional member, so that an adequate supporting force according to a locking operation cannot be obtained and the steering wheel is subject to being operable while in an incomplete locking state, and the locking operation must again be performed after first releasing the initial locking operation.

SUMMARY OF THE INVENTION

An object of the present invention is to provide an improved tiltable steering apparatus for vehicles which obviates the aforementioned drawbacks of the described conventional tiltable steering apparatus.

A further object of the present invention is to provide an improved tiltable steering apparatus for vehicles which can reliably tilt a steering wheel.

A still further object of this invention is to provide an improved tiltable steering apparatus for vehicles which is relatively simple and includes a minimum number of parts.

BRIEF DESCRIPTION OF THE DRAWINGS

Various other features, objects and attendant advantages of the present invention will be more fully appreciated and become better understood when considered in connection with the accompanying drawings, wherein.

DETAILED DESCRIPTION OF THE PREFERRED EMBODIMENT

Figure 1:
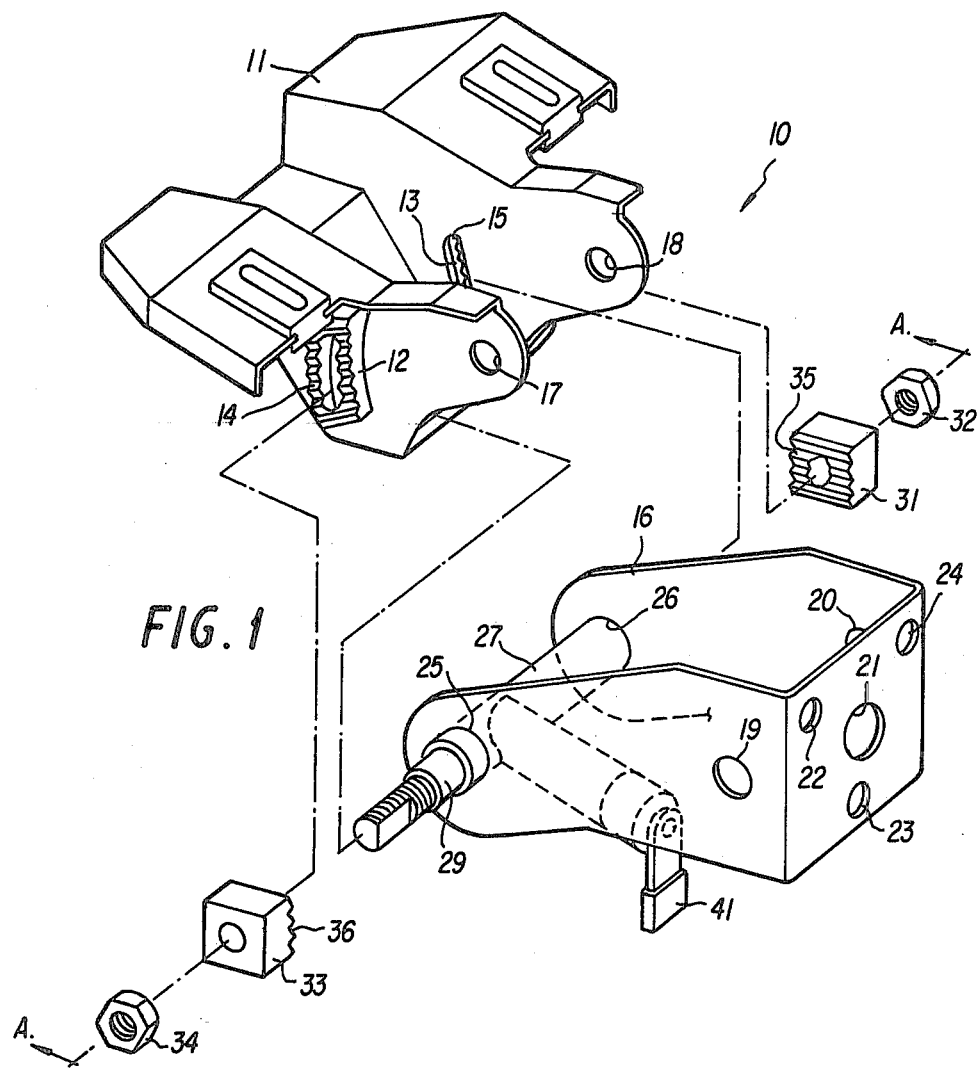
FIG. 1 is an expanded perspective view which shows a preferred embodiment of a tiltable steering apparatus for vehicles constructed according to the present invention.

Referring now to the drawings, and more particularly to FIG. 1, a tiltable mechanism being generally designated by the reference numeral 10 is shown having a fixed bracket 11 with holders 12, 13 being fixed to both sides thereof. The holders 12, 13 are provided with teeth 14, 15, respectively. A movable bracket 16 (on the steering wheel side) having a U-shaped configuration is rotatably supported to the fixed bracket 11 by pin means (not shown) penetrating aligned holes 17, 18 in the fixed bracket 11 and similarly aligned holes 19, 20 in the legs of the U-configured movable bracket 16.

The movable bracket 16 is provided with a hole 21 for guiding a main shaft through a bearing (not shown) therein and holes 22, 23, 24 for fixing a bearing case (also not shown), all being disposed in the base portion of the U-configured bracket 16. The movable bracket 16 is further provided with aligned holes 25, 26 at the forward ends of both legs of the bracket, through which the arms of a substantially T-shaped guide member 27 outwardly extend, being fixed to both legs of the movable bracket 16 in a manner described hereinbelow.

Figure 2:
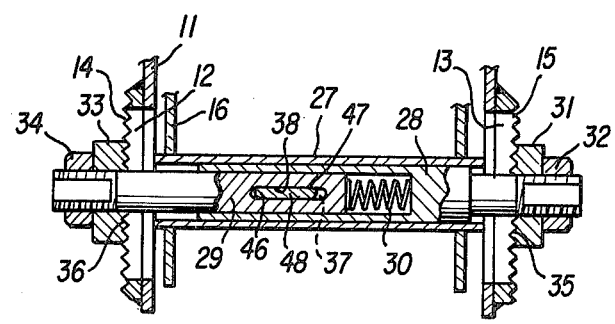
FIG. 2 a sectional view taken along the line A—A in FIG. 1.

As viewed from FIG. 2, a first shaft 28 is slidably disposed within the cylindrical guide member 27 and a second shaft 29 is slidably disposed within one end of the first shaft 28. A compressed spring 30 is interposed between an inner wall of the first shaft 28 and the right end wall of the second shaft 29. The first shaft 28 is accordingly rightwardly urged and the second shaft 29 is leftwardly urged by the spring 30. A latch 31 and a nut 32 are fixed to the right end of the first shaft 28 extending beyond the one leg of the bracket 16, and a latch 33 and a nut 34 are fixed to the left end of the second shaft 29 extending outside the other leg of the bracket 16. The latch 31 is provided with a toothed portion 35 which is engageable with the teeth 15 of the holder 13 and the latch 33 is provided with a toothed portion 36 which is engageable with the teeth 14 of the holder 12, respectively. The first and second shafts 28, 29 are also provided with elongated grooves 37, 38.

Figure 3:
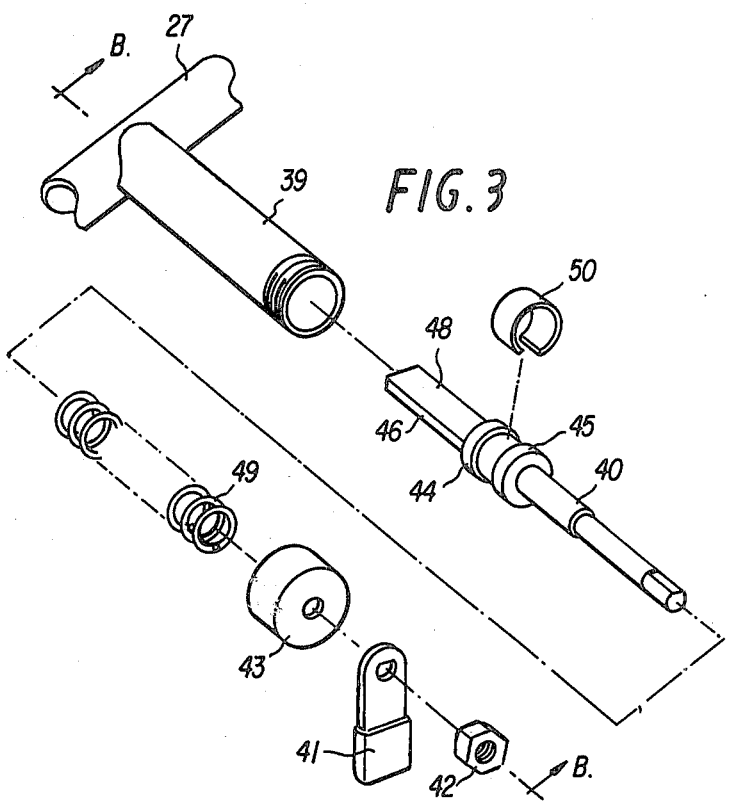
FIG. 3 is a similar view to FIG. 1, however showing an operating portion of the tiltable steering apparatus.
Figure 4:
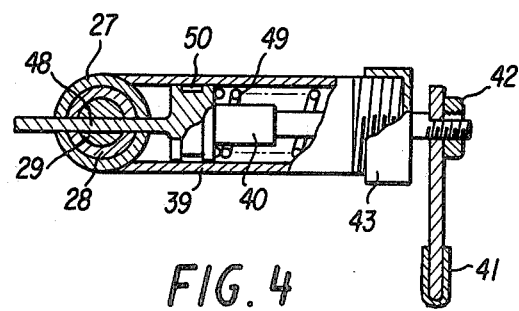
FIG. 4 is a similar view to FIG. 2, being taken along the line B—B in FIG. 3.

In FIGS. 3 and 4, a locking shaft 40 is shown being slidably disposed within a shaft portion 39 of the substantially T-configured guide member 27. A release knob 41 and a nut 42 are fixed to the exposed right end of the locking shaft 40. A cap-like stopper 43 is threadably fixed to the end of the shaft portion 39 of the guide member 27. The locking shaft 40 is provided with stepped portions 44, 45 and an extended portion 48 having tapered portions 46, 47 at both sides of the left end thereof, as viewed in FIG. 3. A spring 49 is interposed between the stepped portion 45 of the locking shaft 40 and an inner wall of the stopper 43. The locking shaft 40 is thus leftwardly urged by the spring 49 into the shaft portion 39. A ring-like member 50 is disposed between the stepped portions 44, 45 of the locking shaft 40. The extended portion 48 of the locking shaft 40 is inserted into the aligned elongated grooves 37, 38 of the first and second shafts 28, 29, as shown in FIG. 2. The tapered portion 46 of the extended portion 48 of the locking shaft 40 is thus located at the left end of the elongated groove 37 of the first shaft 28 and the tapered portion 47 thereof is located at the right end of the elongated groove 38 of the second shaft 29 in the state of FIG. 2.

The operation of the invention is as follows:

When a driver desires to tilt a steering wheel (not shown) to a desired position, the release knob 41 is rightwardly pulled, as viewed in FIG. 4. The locking shaft 40 then rightwardly slides within the shaft portion 39 of the guide member 27 against the urging force of the spring 49. Accordingly, the extended portion 48 of the locking shaft 40 also slides rightwardly, and a gap between the tapered portion 46 of the extended portion 48 and the left end of the elongated groove 37 of the first shaft 28 is generated, whereby the first shaft 28 is rightwardly or outwardly moved by the urging force of the compressed spring 30 in FIG. 2. A similar gap is simultaneously generated between the tapered portion 47 of the extended portion 48 and the right end of the elongated groove 38 of the second shaft 29, whereby the second shaft 29 is leftwardly or outwardly moved by the same urging force of the spring 30 in FIG. 2. The toothed portion 35 of the latch 31 is thus disengaged from the teeth 15 of the holder 13 by such rightward movement of the first shaft 28 and the toothed portion 36 of the latch 33 is disengaged from the teeth 14 of the holder 12 by such leftward movement of the second shaft 29. Accordingly, the movable bracket 16 (on the steering wheel side) can be tilted respective to the fixed bracket 11. After the desired position of the steering wheel is obtained by the driver, the release knob 41 is released, so that the locking shaft 40 slides under the urging force of the spring 49 back into the shaft portion 39. Accordingly, the extended portion 48 of the locking shaft 40 also slides leftwardly and the tapered portions 46, 47 thereof move into the grooves 37, 38 of the shafts 28, 29, whereby the first shaft 28 is leftwardly moved against the urging force of the spring 30 and the second shaft 29 is rightwardly moved against the same urging force of spring 30 (FIG. 2). The toothed portion 35 of the latch 31 is thus again engaged with the teeth 15 of the holder 13 by the leftward movement of the first shaft 28 and the toothed portion 36 of the latch 33 is again engaged with the teeth 14 of the holder 12 by the rightward movement of the second shaft 29, as shown in FIG. 2. Therefore, the movable bracket 16 is positively fixed in position to the fixed bracket 11.

By the foregoing, there has been disclosed a preferred form of a novel tiltable steering apparatus for vehicles constructed in accordance with the present invention. It will be appreciated that various additions, substitutions, modifications, and omissions may be made thereto without departing from the spirit of the invention.

What is claimed as new and desired to be secured by Letters Patent of the United States is:

1. A tiltable steering apparatus for vehicles, comprising:
   a fixed bracket having toothed portions provided thereon;
   a movable bracket of U-shaped configuration rotatably supported on said fixed bracket;
   a guide member of T-shaped configuration having a first shaft slidably disposed therein, a second shaft axially slidably disposed within one end of said first shaft and means interposed between said first and second shafts for urging the same in opposite directions;
   latch means provided on said first and second shafts and having toothed portions engageable with the toothed portions of said fixed bracket;
   a locking shaft slidably disposed within said guide member in a direction perpendicular to the axial direction of said first and second shafts and operable for causing displacement of said first and second shafts to engage and disengage the toothed portions of said latch and the toothed portions of said fixed bracket; and
   spring means within said guide member for biasing said locking shaft toward said first and second shafts, said biasing being in a direction toward an engaged position in which the toothed portions of said latch means are engaged with the toothed portions of said fixed bracket.

2. A tiltable steering apparatus for vehicles as set forth in claim 1, wherein said first and second shafts are each provided with elongated grooves, and said locking shaft is slidably engageable within said elongated grooves.

3. A tiltable steering apparatus for vehicles comprising:
   a fixed bracket having first and second substantially parallel legs;
   a holder member provided on the first leg of said fixed bracket on the side of said leg farthest from said second leg, said holder member having teeth facing away from said first and second legs;
   a substantially U-shaped movable bracket having legs that form the sides of the U-shape, said movable bracket being rotatably supported on said fixed bracket about an axis of rotation passing through said legs of said movable bracket and said legs of said fixed bracket;
   a latch member having a toothed portion engageable with said teeth of said holder member;
   means for engaging and disengaging said toothed portion of said latch member and said teeth of said holder member, said means engaging and disengaging comprising a slidable member to which is mounted said latch member, said slidable member passing through a leg of said movable bracket and said first leg of said fixed bracket; and
   a guide member comprising two hollow cylindrical members intersecting to form a T-shape, the crossing portion of said T-shape being fixed between said legs of said movable bracket, said guide member further comprising means for receiving and slidably guiding within said hollow cylindrical members the said means for engaging and disengaging.

4. A tiltable steering apparatus for vehicles, comprising:
   a fixed bracket having toothed portions provided thereon;
   a movable bracket of U-shaped configuration rotatably supported on said fixed bracket;
   a guide member of T-shaped configuration having a first shaft slidably disposed therein, a second shaft axially slidably disposed within one end of said first shaft and means interposed between said first and second shafts for urging the same in opposite directions;
   latch means provided on said first and second shafts and having toothed portions engageable with the toothed portions of said fixed bracket; and
   a locking shaft slidably disposed within said guide member in a direction perpendicular to the axial direction of said first and second shafts and operable for causing displacement of said first and second shafts to engage and disengage the toothed portions of said latch means and the toothed portions of said fixed bracket.

* * * * *